United States Patent Office 3,251,852
Patented May 17, 1966

3,251,852
AMINO POLYMERS
Melvin De Groote and Jen Pu Cheng, St. Louis, Mo., assignors to Petrolite Corporation, Wilmington, Del., a corporation of Delaware
No Drawing. Filed June 15, 1959, Ser. No. 820,116
12 Claims. (Cl. 260—309.6)

This invention relates to the reaction of (1) polymerized epoxy-compounds containing labile halogens with (2) polyamines, and to the resulting products. More specifically, this invention relates to the reaction of (1) 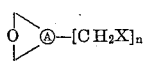

compounds polymerized through their epoxide groups, wherein Ⓐ is an organic radical such as a hydrocarbon radical and preferably an alkylene radical, and X is a halogen atom, preferably chlorine and n is an integer with (2) polyamines, and to the resulting products. Still more specifically, this invention relates to the reaction of (1a) a polymer containing epichlorohydrin units,

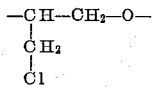

or (1b) 1,4-dichlorobutane epoxide-2,3 units,

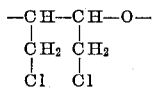

with (2) polyamines and to the resulting products. This invention also relates to derivatives of these products, for example oxyalkylated, acylated, oxyalkylated and acylated, acylated, oxyalkylated, acylated derivatives, etc., salts, quaternary, etc. This invention also relates to the use of these compounds in various applications.

THE HALOGEN-CONTAINING POLYALKYLENE ETHER POLYMERS

In general, halogen-containing polyalkylene ether polymers, also called "halo polymers," are prepared by polymerizing halogen-containing alkylene oxides employing any of the procedures known to the art. Since the halohydrin of the halo polymer is susceptible to reaction with bases, an acid catalyst is generally employed, for example, metal halides, such as iron chloride, ($FeCl_3$), iron bromide, ($FeBr_3$), etc., zinc chloride ($ZnCl_2$), $SnCl_4$, $SnCl_2$, $SbCl_5$, titanium tetrachloride, other Friedel-Crafts catalysts, etc., fluorine compounds such as boron trifluoride, HF, silicon tetrafluoride, hydrofluosilicic acid, and ether complexes thereof, etc., aluminum sulfate, sodium acid sulfate, sulfuric acid, and the like. These are exemplary of some of the acid catalysts useful in preparing these polymers. Other acid catalysts useful in preparing polyalkylene oxides can also be employed. Examples of such catalysts can be found in U.S. Patents Nos. 2,293,868, 2,706,181, and elsewhere.

Although a wide variety of acid catalysts in ratios heretofore disclosed can be employed in preparing the halo polymers, the preferred catalyst is $BF_3$, preferably employed as an ether complex, (the preferred ether being diethyl ether), in ratios of 0.075%–5% or higher of active $BF_3$, for example, 0.1–2%, but preferably 0.1–0.2% based on weight of the alkylene oxide. Although the catalyst can be added at the beginning of the reaction, it is preferable to add the catalyst intermittently during polymerization.

Temperature and pressure ranges for polymerizing alkylene oxides are well known. Similar conditions can be employed in polymerizing the halogen containing alkylene oxides of this invention. However, we prefer to polymerize at a temperature range of 50–150° C. or higher, but most preferably 80–90° C., and a pressure of atmospheric to 150 p.s.i. but preferably atmospheric to 80 p.s.i. For example, since epichlorohydrin boils at 118° C., reaction pressure would normally be atmospheric below this temperature. When more volatile alkylene oxides are copolymerized with a chlorine-containing alkylene oxide, higher temperatures and pressures may be required, for example, temperatures of 110–150° and pressures of 30–80 p.s.i. or higher. However, it should be remembered that polymerization conditions can be varied widely and that variance in one condition might allow variance in another. For example, the temperature at which polymerization occurs will depend on the particular system and especially upon the catalyst concentration. However, at higher catalyst concentration the reaction can be run at a lower temperature and correspondingly lower pressures.

In making halo polymers and copolymers using acid catalysts, the monomer or mixture of monomers and the catalyst may simply be charged together in a closed vessel and heated until polymerization is complete. The mixture is advantageously agitated during polymerization. The proportion of catalyst used is small, being satisfactorily from 0.075 to 5 percent by weight of the oxide to be polymerized, preferably 0.1 to 0.2 percent. In general, the maximum yields of high molecular weight polymer are obtained with the lowest operable proportion of catalyst within the range given. Polymerization temperature is in the range of 50° to 150° C., or higher, with 70° to 120° C., being preferred, and 70°–100° about the optimum. Below 70° C. the polymerization takes longer, whereas at much above 120° C. the yield of high molecular weight polymer is reduced. Within the 50° to 150° temperature range, the polymerization time may vary from 2 to 200 hours, or more, the shorter times being at the higher temperatures. In the optimum range of 70° to 100° C., a time of 3 to 50 hours is usually sufficient to insure substantial completion of the reaction.

Instead of effecting mass polymerization, the procedure may be carried out with the oxide monomer, catalyst, and product, all dissolved in an inert solvent. In general, roughly equal proportions of monomer and solvent are used. Preferred solvents are dioxane, diisopropyl ether, petroleum ether, carbon tetrachloride, benzene, xylene, and n-hexane. It is advantageous to choose a solvent which boils at about polymerization temperature, and to heat the solution to induce gentle reflux, thereby insuring close control of temperature. The presence of a solvent reduces slightly the rate of polymerization but favors conversion of a somewhat higher proportion of the monomer to the high molecular weight polymer.

The crude product resulting from the polymerization or copolymerization process contains, in addition to the desired high molecular weight polymer, low molecular weight polymers which may have formed, residual oxide monomer, such solvent as was employed, and catalyst residue. This crude material is first treated with alkali hydroxide or alkali carbonate to neutralize the acid catalyst. Then it is heated under reduced pressure to remove the solvent, the low molecular weight polymer, the residue oxide monomer and the water which was added during neutralization. The salt of neutralization may be removed by filtration of the dried product or by water washing of the product before the vacuum stripping.

As stated above, the halogen-containing polyalkylene ethers are prepared by any of the general methods known to the art for preparing polyethers, for example, by polymerizing epichorohydrin, 1,4 dichlorobutane epoxide-2,3, etc. in the presence of water or other oxyalkylation-susceptible material such as R(OH)$_x$ or R(NHR)$_x$ compounds, for example glycols, alcohols, glycerols, phenols, phenolic resins, pentaerythritol, triethanolamine, trishydroxymethyl-aminomethane, etc., according to the general reaction

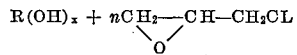

or

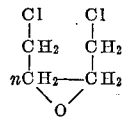 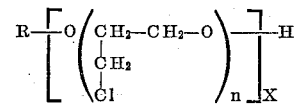

or

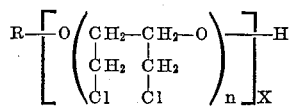

wherein R=H, or an organic radical, and X and $n$ are numerals greater than zero. Where an amine is employed, the initial oxygen would be nitrogen.

The preferred method of carrying out the reaction is to add the chlorine-containing polyalkylene oxide to a stirred, pre-heated mixture of water or other appropriate reagent and an acidic catalyst in a reaction vessel. By adding the chlorine-containing polyalkylene oxide to the reaction vessel at such a rate that it reacts as rapidly as added, and the heat generated by the reaction balances the cooling applied so that the temperature of the reaction is maintained at a predetermined value, an excess of the alkylene oxide is avoided and control of the reaction is simplified.

Thus, by these processes, chlorine-containing polyalkylene ethers having plural (A)
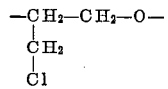

units and (B)
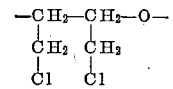

units can be prepared. In addition both random and block halopolymers having both of the above repeating units can be prepared, for example, a random polymer

HOABABABBAA etc. —OH or a block polymer HOB$_a$A$_b$B$_c$A$_d$B$_e$OH wherein A and B have the meaning stated above.

In addition, both random and block copolymers can be prepared by co-reacting any one or both of the above chlorine-containing alkylene oxides with other alkylene oxides, for example, those of the general formula

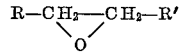

where R and R' are hydrogen or a hydrocarbon group, for example, an alkyl group such as methyl, ethyl, propyl, butyl, octyl, aryl, etc. Examples of suitable alkylene oxides comprise ethylene, propylene, butylene, octylene, styrene, etc. oxides. Examples of random copolymers comprise the following where:

A is

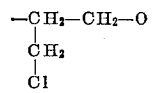

B is

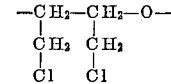

C is

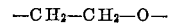

D is

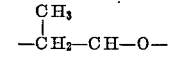

E is

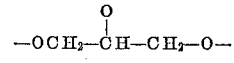

F is

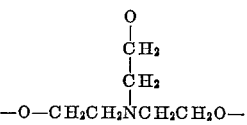

*Random polymers*

HOABCDBACDDCBAOH
HOACDADCCDAADCADCOH
HOBCDBDCCDBBDCBDCOH
OH
B
D
A
C
HOCDACEACBDBOH

*Block polymers*

HOC$_m$A$_a$C$_m$OH
HOD$_b$A$_a$D$_b$OH
HOD$_c$A$_b$C$_a$A$_b$D$_c$OH
HOC$_c$D$_b$C$_a$D$_b$C$_c$OH
HOD$_b$B$_a$D$_c$OH
HOC$_c$B$_b$C$_a$B$_b$D$_c$OH
HOD$_d$B$_c$C$_b$A$_a$C$_b$B$_c$D$_d$OH
HOC$_d$A$_c$C$_b$A$_a$C$_b$A$_c$C$_d$OH
HOC$_d$D$_c$C$_b$B$_a$C$_b$D$_c$C$_d$OH
HOC$_d$B$_c$C$_b$B$_a$C$_b$B$_c$C$_d$OH
HOC$_d$B$_c$D$_b$A$_a$D$_b$B$_c$C$_d$OH
OH
A$_a$
B$_e$
D$_b$
C$_a$
HOA$_a$B$_c$D$_b$C$_a$FC$_a$D$_b$B$_e$A$_a$OH

Of course, it will be realized that the above representations are not a total picture of the presentations and combinations possible. By varying the ratios and type of each, block, hydrophilic and hydrophobic properties can be imparted to the halopolymer. These polymers can be atactic, isoactic, or syndiotactic. In addition, polyfunctional oxyalkylation susceptible compounds can be employed, for example, glycols, glycerol, amines, hydroxy-amines, polycarboxylic acids, etc. Furthermore, other chlorine-containing polyalkylene oxides can also be formed. In addition, other halogen groups may be attached to the epoxide such as bromine, iodine, etc.

The following patents describe the preparation of chlorine-containing polyalkylene ethers: 2,706,189, 2,871,219, the latter of which discloses the preparation of solid polymers of epichlorohydrin.

Our preference is to use commercially available polyepichlorohydrins which generally run from about 450 to 1150 molecular weight. One manufacturer, Dow Chemical Company, Midland, Michigan, supplies three different grades. The designation and the particular composition is indicated in the following table. Comparable products are available from other manufacturers.

The following examples are presented by way of illustration and not limitation. In view of the fact that polyepichlorohydrin polymers are well known and even available commercially, we shall illustrate the preparation of the halopolymer with poly 1,4-dichlorobutane epoxide-2,3 which is a new polymer.

| Product | Formula | Description | Molecular Weight |
|---|---|---|---|
| Polyepichlorohydrin: | | | |
| Polyglycol 166-450 | HO(C₃H₅ClO)ₙC₃H₅ClOH | Viscous liquid | Avg. 450. |
| Polyglycol 166-900 | HO(C₃H₅ClO)ₙC₃H₅ClOH | do | Avg. 900. |
| Polyglycol 166-1150 | HO(C₃H₅ClO)ₙC₃H₅ClOH | do | Avg. 1150. |

*Example 1a*

This example illustrates the preparation of a polymer containing plural

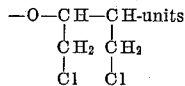

First 180 grams of water, 10 ml. of BF₃-ether complex, 2,000 grams of benzene and 1 ml. of a 50% solution of diisopropyl-naphthalene sulfonic acid in xylene were mixed with vigorous stirring to form a well dispersed emulsion. The sulfonic acid functioned as dispersing agent although it also has catalytic effect. Large quantities of benzene are employed to disperse water so as to facilitate heat transfer and to insure a smooth reaction for otherwise the reaction could become violent, especially at the initial stage. Then, with the temperature of this mixture maintained at 70–80° C. by intermittent heating and cooling, 7050 grams of 1.4 dichloro epoxybutane,

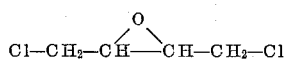

was added to it, dropwise, over a period of seven hours. At the end of the first, third and fifth hour, additional amounts of BF₃ ether complex of 5 ml. each were also added to increase the rate of reaction. After the addition of all the dichloroepoxybutane, the mixture was heated at 70–80° C. for two more hours. Then the temperature was raised to 150° C. and a vacuum of 28 inches of mercury was applied to remove benzene and other volatile materials. The product obtained was a brown, very viscous liquid, contained 48.65% of chlorine. It was xylene and alcohol soluble, hexane and water insoluble.

*Example 2a*

This example illustrates the preparation of a block polymer containing polydichloroepoxybutane units as well as ethylene oxide and propylene oxide units prior to reaction with the polyamine.

First, 1500 grams of the product obtained from Example 1a was mixed with 1500 grams of xylene and 32 ml. of BF₃ ether complex. Then, with the temperature of the mixture maintained at 115–130° C., 950 grams of propylene oxide and 720 grams of ethylene oxide were added to its consecutively and in that order. The rate of addition was controlled such that the pressure inside the autoclave did not exceed 50 p.s.i. About one hour after the ethylene oxide had been added, the pressure inside the autoclave came down to 1–3 p.s.i. The reaction was considered complete and a vacuum of 28 inches of mercury was applied to remove all the xylene. The product obtained was a yellow colored viscous oil. It was soluble in xylene, alcohol, insoluble in hexane and emulsifiable in water. The chlorine content was 23.17%.

THE POLYAMINES

A wide variety of reactive polyamines can be reacted with the halopolymers. In general these amines should contain a reactive position on at least one amino group which is capable of reacting with the halomethyl radical of the polymer. Therefore, these amines should have at least one active H—N< group containing a labile hydrogen.

Among the reactive polyamines which can be employed are included aliphatic polyamines, cycloaliphatic polyamines, aromatic polyamines, heterocyclic polyamines and polyamines containing one or more of the above groups. Thus, the term "polyamine" includes compounds having one amino group on one kind of radical, for example, an aliphatic radical, and another amino group on the heterocyclic radical as in the case of the following formula:

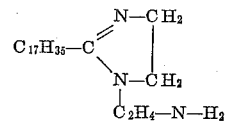

It also includes compounds which are totally heterocyclic, having a reactive amino group and polyamines having other elements besides carbon, hydrogen and nitrogen, for example, those also containing oxygen, etc.

It also includes polyamines having one amino group attached to one type of radical and another amino group attached to another radical, for example, menthane diamine

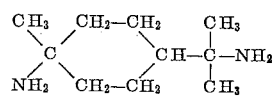

as well as those containing tertiary as well as primary or secondary amino groups providing at least one of the amino groups has a labile nitrogen bonded hydrogen.

The polyamines which may be employed as reactants fall within two types. The first type is characterized by the fact that the polyamines have at least one primary amino radical separated from another primary or secondary amino radical by two to three carbon atoms in a single chain. These polyamines under certain conditions can form cyclic amidines.

One may use polyamines corresponding to the formula

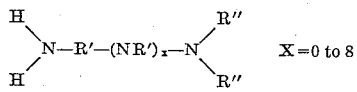

in which R″ is hydrogen, alkyl, cycloalkyl, aryl, or aralkyl R′ is a divalent radical such as —CH₂CH₂—,

—CH₂CH₂CH₂—

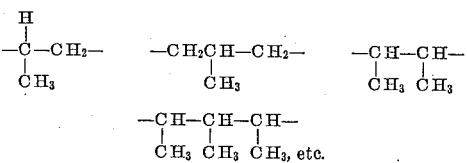

Stated another way, the polyamines have at least one primary amino group separated from another primary or secondary amino group by 2 to 4 carbon atoms. Examples of suitable amines include:

Ethylenediamine
Diethylenetriamine
Triethylenetetramine
Tetraethylenepentamine
Propylenediamine
Dipropylenetriamine
Tripropylenetetramine
Butylenediamine
Aminoethylpropylenediamine
Aminoethylbutylenediamine Other polyamines in which the nitrogen atoms are separated by a carbon atom chain having 4 or more carbon-atoms include the following: Tetramethylenediamine, pentamethylene-diamine, and especially hexamethylene-diamine. The latter is of particular interest because the product is commercially available in light of its use in the manufacture of synthetic fibre.

If desired, one can prepare a variety of reactants having two or more amino groups and at least one hydroxyl group. One may use modifications of procedures or the procedures themselves as described in U.S. Patents Nos. 2,046,720 dated July 7, 1936, to Bottoms; 2,048,990 dated July 28, 1936, to Britton et al.; 2,447,821 dated August 24, 1948, to Sankus; and 1,985,885 dated January 1, 1935, to Bottoms. Examples include the following:

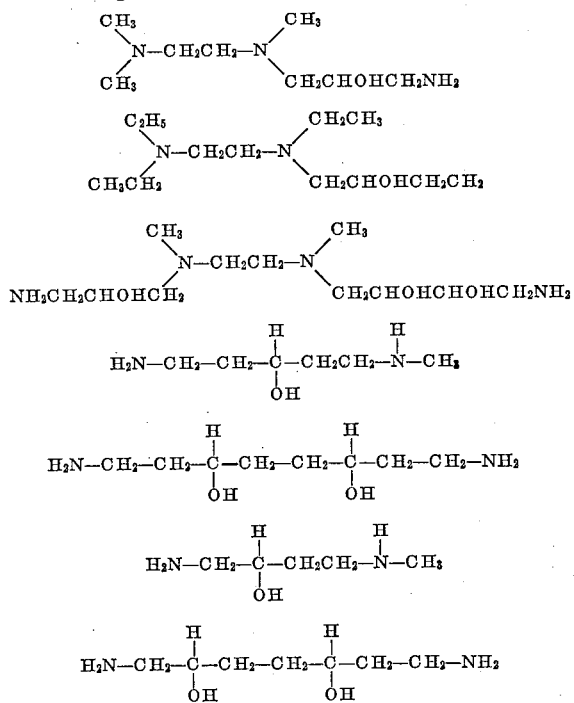

Other suitable amines are exemplified by ethylene-bisoxypropylamine,

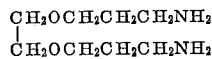

Other compounds including those having cyclic structures include piperazine, and the corresponding derivatives.

Another type of polyamine which may be employed as a reactant are the kinds described as "Duomeens."

TABLE 1

"Duomeen" is a trademark designation for certain diamines made by Armour Chemical Division, Armour & Company, Chicago, Illinois. The "Duomeens" have the following general formula:

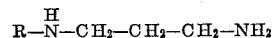

R is an alkyl group derived from a fatty acid or from the mixed fatty acids as obtained from certain amines. The specific "Duomeen" and the source of the radical R are as follows:

(1) Duomeen 12  R=lauric
(2) Duomeen C  R=coconut oil fatty acid
(3) Similarly, a comparable diamine, presumably obtained from Rosin Amine D and acrylonitrile, is obtainable from Hercules Powder Company, Wilmington, Delaware. The composition of Rosin Amine D is as follows:

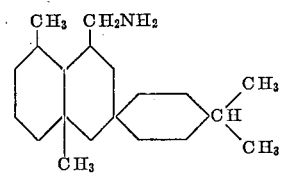

Polyamines from monoamines and cyclic imines, such as ethylene imine.

TABLE 3

(4) $C_8H_{17}-\overset{H}{N}-CH_2CH_2-NH_2$  N-octyl ethylenediamine (5) $C_{14}H_{29}-\overset{H}{N}-CH_2CH_2-NH_2$  N-tetradecyl ethylenediamine (6) $C_{16}H_{33}-\overset{H}{N}-CH_2-CH_2-NH_2$  N-hexadecylethylenediamine (7) 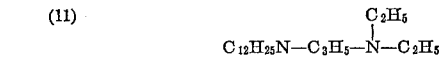 N-dodecyl triethylenetetramine (8) $C_{12}H_{25}-\overset{H}{N}-C_3H_6-NH_2$  N-dodecyl propylenediamine (9) $C_{19}H_{21}-\overset{H}{N}-C_4H_8-NH_2$  N-decyl butylenediamind

(10) Polyamines also containing tertiary amino groups.

(11) $C_{12}H_{25}N-C_3H_5-\overset{C_2H_5}{\underset{C_2H_5}{N}}$

It is to be noted that all the above examples show high molal groups, i.e., 8 carbon atoms or more. The same derivatives in which methyl, ethyl, propyl, butyl, amyl, hexyl groups, or the like, appear instead of octyl, decyl, etc., are equally satisfactory.

Polyamines of the kind described above can be converted into a number of products which in turn still have the characteristic requirements previously noted, i.e., are capable of reaction with the halopolymer. A good example is a cyclic amidine obtained from polyamine. This may be illustrated by the following table:

TABLE 2

(1) 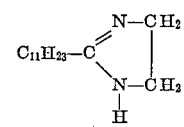

2-undecylimidazoline (2) 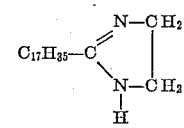

2-heptadecylimidazoline (3) 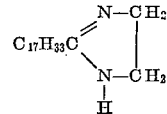

(4) 2-oleylimidazoline

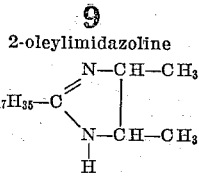

(5) 2-heptadecyl-4,5-dimethylimidazoline

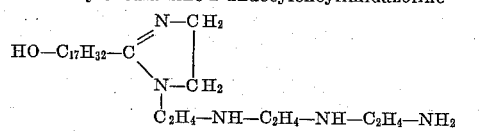

1-diethylenediamine-2-undecyleneylimidazoline (6) 
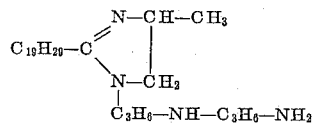

triethylenetriamino-2-hydroxyheptadecyleneylimidazoline (7) 
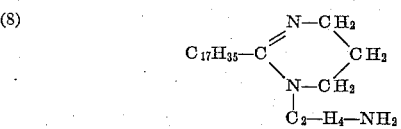

1-aminopropylaminopropyl, 2-abietyl, 4-methylimidazoline tetrahydropyrimidines from monocarboxy acids and trimethylenepolyamines (8) 
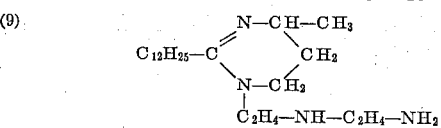

1-aminoethyl, 2-heptadecyltetrahydropyrimidine (9) 
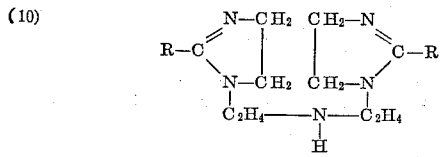

1-aminoethylaminoethyl, 2-dodecyl, 4-methyl tetrahydropyrimidine

Cyclic amidines are derived conveniently from carboxy acids, including polycarboxy acids. As is well known, some polycarboxy acids have 3 or more carboxyl radicals; thus, it is possible to obtain cyclic amidines in which 3 or more ring radicals appear.

Cyclic amidines having more than one ring radical are illustrated by the following formulas:

(10)

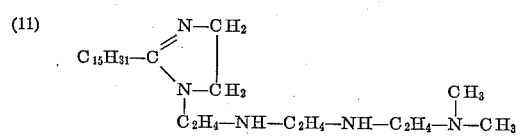

R=hydrocarbon radical containing 8–32 carbon atoms

Cyclic amidines containing basic tertiary amino groups:

(11)

$$C_{15}H_{31}-C\begin{array}{c}N-CH_2\\ \\N-CH_2\end{array}$$
$$\phantom{C_{15}H_{31}-C\ \ }C_2H_4-NH-C_2H_4-NH-C_2H_4-N(CH_3)-CH_3$$

It is to be noted that all the above examples show high molal groups, i.e., 8 carbon atoms or more. The same derivatives in which methyl, ethyl, propyl, butyl, amyl, hexyl groups, or the like, appear instead of groups having 11, 12, 17 or 19 carbon atoms, are equally satisfactory.

Actually, cyclic amidines of the kind described previously are obtained in many instances from amides as intermediates in amidine manufacture. Suitable amides derived from amines of the kind described previously are suitable as reactants for the present purpose. Such amides are shown in the following table:

TABLE 3

(1) $$C_{17}H_{35}-\overset{O}{\overset{\|}{C}}-\overset{H}{N}-C_2H_4-NH_2$$
aminoethylstearamide (2) $$C_{17}H_{33}-\overset{O}{\overset{\|}{C}}-\overset{H}{N}-C_2H_4-\overset{H}{N}-C_2H_4-NH_2$$
aminoethylaminoethyloleamide (3) $$C_9H_{19}-\overset{O}{\overset{\|}{C}}-\overset{H}{N}-C_2H_4-\overset{H}{N}-C_2H_4-NH_2$$
aminopropylaminopropyldecanoamide (4) $$C_{15}H_{31}-\overset{O}{\overset{\|}{C}}-\overset{H}{N}-C_4H_8-\overset{H}{N}-C_2H_4-\overset{H}{N}-C_2H_4-NH_2$$
aminoethylaminoethylaminobutylpalmitamide (5) $$C_{19}H_{29}-\overset{O}{\overset{\|}{C}}-\overset{H}{N}-CH_2-CH_2-NH_2$$
aminoethyl abietamide (6) $$C_{19}H_{29}-\overset{O}{\overset{\|}{C}}-\overset{H}{N}-C_3H_6-NH_2$$
aminopropylabietamide (7) $$C_{17}H_{33}-\overset{O}{\overset{\|}{C}}-\overset{H}{N}-C_3H_6-\overset{H}{N}-C_2H_4-NH_2$$
aminoethylaminopropyloleamide (8) $$C_7H_{15}\overset{O}{\overset{\|}{C}}-\overset{H}{N}-C_2H_4-\overset{H}{N}-C_2H_4-\overset{H}{N}-\overset{O}{\overset{\|}{C}}-C_7H_{15}$$
diethylenetriamine dicaprylamide (9) $$C_{17}H_{35}-\overset{O}{\overset{\|}{C}}-\overset{H}{N}-C_3H_6-\overset{H}{N}-\overset{O}{\overset{\|}{C}}-C_{17}H_{35}$$
propylenediamine distearamide Polyamides are derived from polycarboxy acids as well as monocarboxy acids. Thus, it is possible to get polyamides by using acids containing more than one carboxyl group, as illustrated in the following examples:

(10) $$H_2N-C_2H_4-\overset{H}{N}-\overset{O}{\overset{\|}{C}}-R-\overset{O}{\overset{\|}{C}}-\overset{H}{N}-C_2H_4-NH_2$$

R—(COOH)₂=Emery dimeric acid

(11) $$H_2N-C_2H_4-\overset{H}{N}-\overset{O}{\overset{\|}{C}}-(CH_2)_8-\overset{O}{\overset{\|}{C}}-\overset{H}{N}-C_2H_4-NH_2$$

Another procedure is to use a secondary amine, such as dibutylamine or dihexylamine, and react stepwise with ethylene imine or propylene imine. The polyamine so obtained contains a basic tertiary amino radical. The acylation of such polyamine results in an amino amide which will form complexes comparable to those obtained from a basic tertiary amine. Examples of such amino amide are as follows:

(12) $$C_{17}H_{33}-\overset{O}{\overset{\|}{C}}-\overset{H}{N}-C_2H_4-\overset{H}{N}-C_2H_4-\overset{CH_3}{\overset{|}{N}}-CH_3$$

(13) $$C_{11}H_{23}-\overset{O}{\overset{\|}{C}}-\overset{H}{N}-C_3H_6-\overset{H}{N}-C_2H_4-\overset{CH_3}{\overset{|}{N}}-CH_3$$

It is to be noted that all the above examples show high molal groups, i.e., 7 carbon atoms or more. The same derivatives in which methyl, ethyl, propyl, amyl, butyl, hexyl groups, or the like, appear instead of groups having 9, 17, 19 carbon atoms or the like, are equally satisfactory.

One type of hybrid compound includes either an imidazoline ring or a tetrahydropyrimidine ring. Since it is more economical to use the imidazolines rather than the tetrahydropyrimidines this particular type will be illustrated but it is understood that either type can be used. One example is an instance in which the imidazoline radical appears, and also a high molal radical, for instance, a C₁₃H₁₇ radical. In this instance there are two high molal groups:

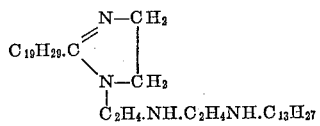

In other instances there may be only one occurrence of the high molal radical, for instance, in the following the only high molal radical appears as a C₁₂H₂₅ radical:

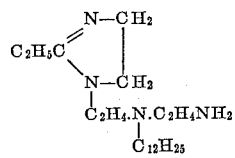

Actually a cyclic amidine having a hydroxy alkyl group may be esterified or amidified, provided that there is still a reactive hydrogen atom for combination with the halopolymer. This is illustrated by the following:

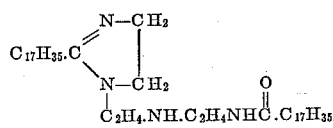

The type in which there is an imidazoline ring and only one high molal amino group is illustrated in the following:

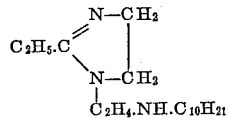

If one employs a dicarboxy acid having 8 or more carbon atoms indicated by R(COOH)₂, then compounds of the following type can be prepared:

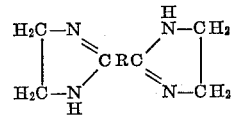

It is obvious that a high molal amine such as N-dodecyl diethylenetriamine having the formula

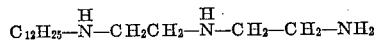

can be converted into an amide by reaction with a low molal acid, such as acetic acid or a high molal acid, such as oleic acid. Such compounds can be illustrated by the following:

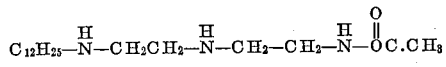
or
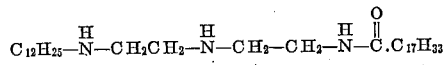

Similarly, if the dodecyl diethylene triamine is treated with a mole of ethylene oxide or preferably 2 moles of ethylene oxide so as to have a terminal radical, thus:

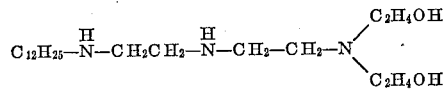

It becomes obvious that an ester can be formed from either acetic acid or oleic acid as illustrated by the following:

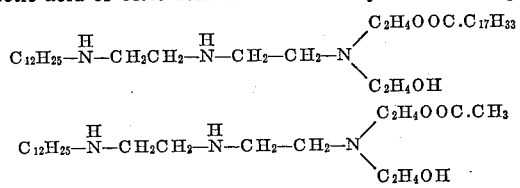

Needless to say, a compound such as dodecyl diethylene triamine previously illustrated can be converted into an imidazoline by conventional procedure, such a procedure already has been described above. The imidazoline may be derived from either a low molal acid or acetic acid, or a high molal acid, such as oleic acid.

Similarly, an amine of the following type:

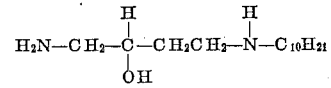

can be converted into an oxazoline by using either a low molal monocarboxy acid or a high molal monocarboxy acid; or if the C₁₀H₂₁ radical above is replaced by a CH₃ radical suitable compounds are obtained using a higher fatty acid, such as oleic acid.

Such compounds can be illustrated by the following:

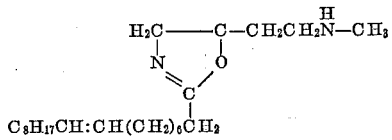

An interesting group of compounds are the non-cyclic amidines having the general formula

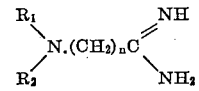

where R₁ and R₂ are either or both an alkyl group or hydrogen, and n, an integer from 7 to 13. See British Patent 518,575.

Specific examples described in said British Patent include the following:

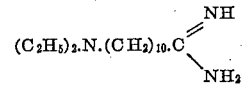

Kappa-diethylamino-n-undecane amidine

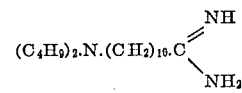

Kappa-dibutylamino-n-undecane amidine

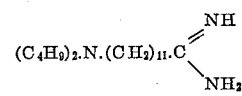

Lambda-dibutylamino-n-dodecane amidine

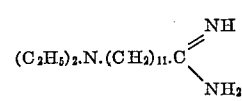

Lambda-diethylamino-n-dodecane amidine

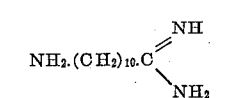

Kappa-amino-n-undecane amidine

Other suitable polyamino compounds which form salts or salt complexes as herein described, may contain acyl radicals or an acyl radical residue from low molal monocarboxy acids as, for example, acetic acid, propionic acid, butyric acid, hydroxyacetic acid, lactic acid, etc. This applies not only to cyclic amidines but also other compounds such as high molal polyamines, esters of hydroxylated polyamines, etc. Purely by way of example attention is directed to the following formulas which illustrate such compounds:

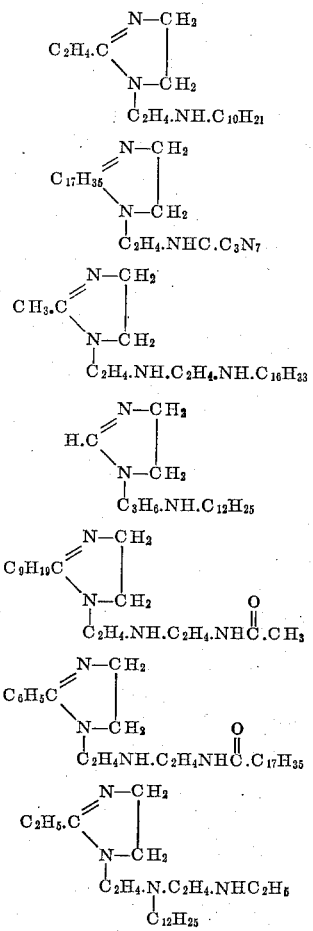

Needless to say, the same comparable compounds can be obtained from another type of cyclic amidines, to wit, a tetrahydropyrimidine.

Other examples suitable for the present purpose are obtained by reacting high molal diamines of the formula

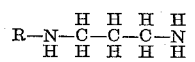

where R varies from 8 to 18 and particularly from 12 to 18, with a single mole of low molal monocarboxy acid such as acetic acid, propionic acid, butyric acid, etc.

In many instances monoamines can be reacted with ethylene imine, propylene imine, to convert a monoamino compound into a polyamino compound. This can be illustrated by suitable polyamino compounds having an oxazoline ring (5-membered or 6-membered).

TABLE 4

General reaction:

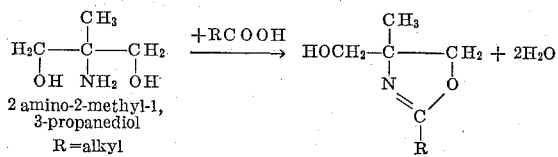

2 amino-2-methyl-1, 3-propanediol
R = alkyl

Stearic acid   $CH_3(CH_2)_{16}COOH$

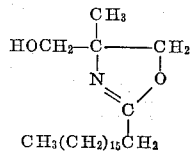 (A)

Oleic acid   $C_8H_{17}CH{:}CH(CH_2)_7COOH$

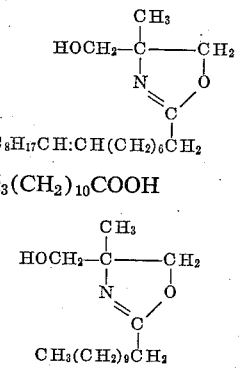 (B)

Lauric acid   $CH_3(CH_2)_{10}COOH$

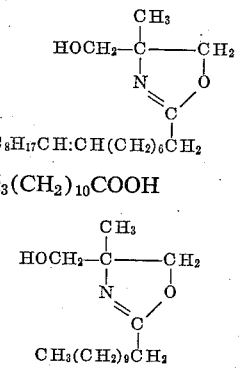 (C)

Let $R_1OH$ be the simplified structure for all the four hydroxyethyl oxazolines.

The above (A), (B), (C) reactions form products which do not contain reactive amino groups. However, these can be converted to reactive compounds by the following general reaction:

TABLE 4.—(Continued)

General reaction:

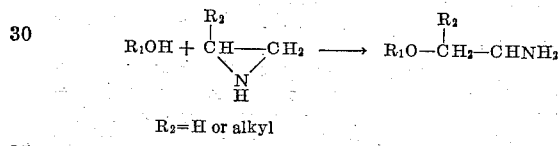

$R_2 = H$ or alkyl (1) (A) + ethylene imine

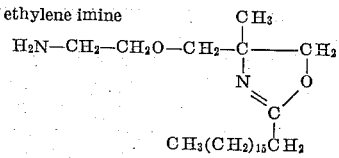

(2) (B) ethylene imine

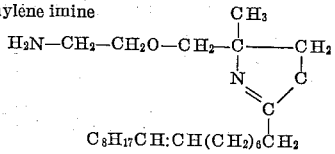

(3) (C) + ethylene imine

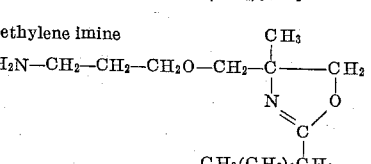

(4) (A) + propylene imine

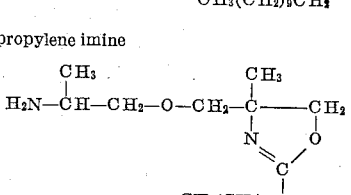

(5) (B) + propylene imine

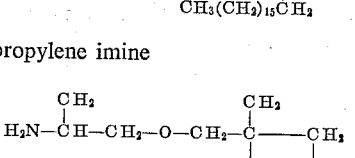

In U.S. Patent 2,819,284—Shen, there is described an apparently new class of materials, to wit, disubstituted cyclic amidines of the class of tetrahydropyrimidines and amino-imidazolines of the structure

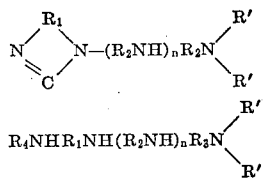

$R_1$, $R_2$, and $R_3$ are divalent hydrocarbon radicals containing at least 2 and not more than 3 carbon atoms in the straight chain; $R_4$ is the radical of an alpha-beta unsaturated acid having not over 18 carbon atoms and obtained by the elimination of the 2 carboxyl oxygen atoms; R is selected from the class of hydrogen atom and hydroxyl alkyl radicals having not over 4 carbon atoms, and $n$ is an integer including zero; and

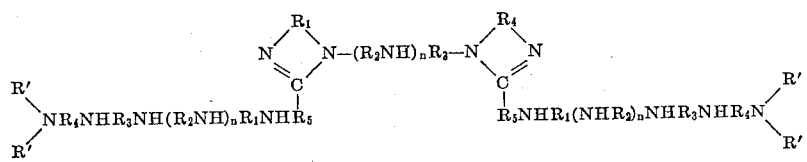

in which $R_4$ is a divalent radical, $R_5$ is derived from an alpha-beta unsaturated acid, and the other symbols have their prior significance.

These materials are obtained by reaction between polyamines such as the polyethylene amines previously described, i.e., triethylene tetramine, tetraethylene pentamine, etc., and certain alpha-beta unsaturated acids such as acrylic acid, crotonic acid, methacrylic acid, agelic acid, and sorbic acid.

It will be noted one can also prepare such products from relatively nondistillable polyethylene amines, for instance, the residual mixture in polyethylene manufacture which consists largely of pentaethylene hexamine or hexaethylene heptamine. Using such high amino compounds having, for instance, 6 to 7 nitrogen atoms per molecule one can obtain reactants which have as many as 20 nitrogen atoms in the molecule. Similarly, one can react dicarboxy or tricarboxy acids with 2 or 3 moles of the same polyamines having 5, 6 or 7 nitrogen atoms and obtain amides, polyamides or combinations in which cyclic amidine groups also appear and which may likewise have as many as 10 to 20 nitrogen atoms per molecule. In a general way, compounds of the types just referred to having up to 20 nitrogen atoms per molecule represent a practical upper limit in many cases.

Said aformentioned Shen U.S. Patent 2,819,284, also describes another class of material which can be used as reactants in the present invention, to wit, a somewhat analogous class of disubstituted cyclic amidines has been illustrated in which one substituent does not necessarily have a nitrogen atom. This is an instance of the kind in which hydroxyethyl ethylene diamine, hydroxypropyl ethylene diamine, hydroxybutyl ethylene diamine, hydroxyethyl 1,3-propylene diamine, hydroxylpropyl 1,3-propylene diamine, hydroxybutyl 1,3-propylene diamine, or the like, are used to give a type of compound previously illustrated to wit,

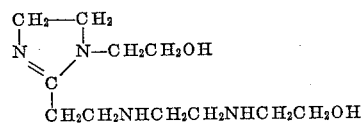

Attention is again directed to the fact that the polynitrogenous reactants preferably contain at least one basic nitrogen and preferably two or more. Furthermore, it is preferable that there be present at least one, and possibly two, primary amino groups. If one reacts ethylene diamine, diethylene triamine, triethylene tetramine, tetraethylene pentamine, or the like with 2 moles of a low molal acid such as acetic acid, propionic acid, butyric acid, or with a higher fatty acid such as oleic acid or stearic acid, or a combination of the two, one can obtain a compound having 2 amido radicals in which there is no basic nitrogen atom. If one uses one mole of an acid there is a single basic nitrogen atom. Our preference, however, is to use compounds in which there are at least 2 basic nitrogen atoms and preferably having at least 2 basic primary amino groups. For this reason the preference in many instances is to employ polyamines such as diethylene triamine, triethylene tetramine, tetraethylene pentamine, etc. In a large number of the examples which have appeared in the sections preceding, the compounds illustrated have high molal radicals, for instance, one having 8 to 18 carbon atoms. It is again desirable to point out that this is no limitation to the broad aspect of the invention. In each instance such high molal radicals can be replaced by a methyl group, ethyl group, propyl group, butyl group, amyl group, hexyl group, heptyl group, or the like.

Another type of compound which may be reacted with the halopolymers are hydrazine and hydrazine derivatives of the kind which have been described in numerous patents. Although hydrazine, particularly the hydrate, can be reacted with the halopolymers provided, of course, that extreme caution is taken to avoid any hazard, we have found it of equal interest to use betahydroxyethyl hydrazine which is commercially available.

See also U.S. Patent No. 2,371,133 which describes hydrazine derivatives containing hydroxyalkyl radicals which comprises condensing one mol of a hydrazide of an aliphatic carboxylic acid containing at least 2 carbon atoms, which hydrazide contains at least one hydrogen atom bound to a hydrazine nitrogen atom with at least one mol of an alkylating agent which is capable of introducing an aliphatic radical containing the grouping —C—C— and also hydroxyl groups.

As to the member of 2-hydroxyethyl hydrazine see U.S. Patent No. 2,660,607 dated November 24, 1953, to Gever et al.

Note also that low polymers of hydrazine of similar compounds, such as polymethylene dihydrazines of the formula $H_2N.NH.(CH_2)_n.NH.NH_2$ may be employed as a reactant with the epoxidized derivatives. For further description of such polymethylene dihydrazines see U.S. Patent No. 2,445,518 dated July 20, 1948, to Dreyfus.

In addition to the above amines, reaction product of these amines with epoxidized fatty materials such as fatty acids can be employed where such products have reactive nitrogen group. Examples of such reaction products can be found described and claimed in the De Groote and Cheng application, Serial No. 532,121 filed September 1, 1955, and assigned to the same assignee as the present application.

Another polyamine that can be reacted with the polymer are those reactive monomeric polyaminomethyl phenols described in application Serial No. 730,510, filed April 24, 1958, De Groote and Shen, and assigned to the same assignee as the present application. These are the reaction products of a methylol phenol and a polyamine.

From the above description it is evident that any polyamine containing a labile hydrogen can be employed.

Further, enumeration of such polyamines would be too voluminous and unnecessary since one skilled in the art knows from the above teaching the type of polyamine to be employed in this invention.

REACTION OF HALOPOLYMER AND POLYAMINE AND THE PRODUCTS FORMED

The reaction involving the labile halogen of the polymer with a labile hydrogen atom attached to nitrogen is well known and generally the reaction involves nothing more than conventional procedure and usually takes place in the presence of a catalyst such as moderate amounts of a base such as KOH, NaOH, metal alcoholates, etc. If these bases are present, the final produce is a free base instead of being the HCl salt NaCl or KCl, or the like is also formed. However, in contrast to the reaction of a polyepihalohydrin with a monoamine wherein no cross-linking or insolubilization of the product can occur because of the monofunctionality of the monoamines, the reaction of a polyepihalohydrin with polyamine; can cause cross-linking or insolubilization unless the reaction is carried out under specified conditions. In general, cross-linking is prevented and/or minimized by employing the following conditions:

(1) *Control of the ratio of reactants.*—This is accomplished by one of two ways: (a) By controlling the number of moles of polyamine reacted with the halopolymer so that it is equal to or greater than the chemically equivalent halo groups on the halopolymer. In practice we employ from about 1 to 2 moles of the polyamine per equivalent halo group, but preferably from 1.1 to 1.5 moles of the polyamine.

(b) By controlling the number of moles of halopolymer so that it is equal to or greater than the equivalent reactive hydrogens on the amino groups. In practice we employ about 1–2 moles of halopolymer, but preferably 1.1 to 1.5 moles of the polymer per equivalent reactive amino hydrogen.

(2) *Control of concentration.*—Minimum cross-linking occurs when the reaction is carried out in as dilute a solution as is practically possible. However, in practice, we employ a dilute solution with about 50% as the upper limit, based on reactants in the solvent.

However, where a more concentrated solution is employed, one can obtain a solvent soluble problem by carefully observing the other factor described in (1) and (3) —namely, ratio and temperature control.

(3) *Temperature control.*—This is accomplished in one of two ways:

(a) The rate of heating.
(b) The maximum temperature.

In practice we prefer to stir the reactants in the solvents at room temperature for as long a time as practical before raising it to the maximum temperature. Such room temperature stirring can be carried out, for example, from 1–24 hours, depending upon the nature of the reactants, the size of the batch, etc. Generally the temperature is raised from room temperature to the maximum temperature in one-half to five hours, but preferably one to two hours. The maximum temperature is preferably less than 100°, although it can be as high as 150° if exposure to this temperature is short.

Any one of these three conditions will tend to minimize or prevent cross-linking. By employing all three conditions the optimum absence or minimization of cross-linking is achieved.

The reactions should be conducted and stopped at a point where the product as such is solvent-soluble. Such solvent-solubilization indicates the absence of or the minimizing of cross-linking since it is well known that when a polymer is sufficiently cross-linked it is insoluble in any solvent.

Such final product is soluble but solubility is not limited to an organic solvent but may include water, or for that matter, a solution of water containing an acid such as hydrochloric acid, acetic acid, hydroxyacetic acid, etc. In other words, the nitrogen groups present, whether two or more, may or may not be significantly basic and it is immaterial whether aqueous solubility represents an anhydro base or the free base (combination with water) or a salt form such as the acetate, chloride, etc. The purpose in this instance is to differentiate from insoluble resinous materials, particularly those resulting from gelation or cross-linking. Not only does this property serve to differentiate from instances where an insoluble material is desired, but also serves to emphasize the fact that in many instances the preferred compounds have distinct water-solubility or are distinctly dispersible in 5% gluconic acid. For instance, the products freed from any solvent can be shaken with 5 to 20 times their weight of 5% gluconic acid at ordinary temperature and show at least some tendency towards being self-dispersing. The solvent which is generally tried is xylene. If xylene alone does not serve then a mixture of xylene and methanol, for instance, 80 parts of xylene and 20 parts of methanol, or 70 parts of xylene and 30 parts of methanol, can be used. Sometimes it is desirable to add a small amount of acetone to the xylene-methanol mixture, for instance, 5% to 10% of acetone.

The following examples are presented by way of illustration and not of limitation.

Example 1b

This example illustrates the reaction of a halopolymer with a polyamine.

First, 290 grams of KOH (85%) was heated at 60–70° C. in 800 grams of methanol until complete solution. Then 640 grams of hydroxyethyl hexamethylene diamine was added and the solution cooled to 20° C. While cooling and stirring was continued, 290 grams of the product obtained from Example 1a was added. The reaction was exothermic. In order to prevent cross-linking and gelation, the temperature was kept between 15–25° C. and the chloromethyl polymer added to the polyamine instead of the polyamine to the chloromethyl polymer. After the addition, the mixture was first reacted at 20–30° C. for 5 hours, then at 80–85° C. (reflux) for four hours. Then it was filtered to remove the salt, vacuum evaporated to remove the solvent and filtered again to remove the solid that came out during evaporation. The product was a clear yellow viscous liquid, soluble in water forming a slightly turbid solution. An analysis showed 13.82% N. (theoretically 14.3%).

To save undue repetition, the invention will be illustrated in table form wherein the reactions were carried out in the manner of Example 1b.

TABLE 5

| Example Number | Polychloromethyl compd. used | Amt., grams | Polyamino compounds used | Amt., grams | KOH used, grams | Methanol used, grams | Temp., °C. | Time, hours |
| --- | --- | --- | --- | --- | --- | --- | --- | --- |
| 1b | 1a | 290 | Hydroxyethyl hexamethylene diamine | 640 | 290 | 1,600 | 20–30 / 80–85 | 5 / 4 |
| 2b | 1a | 145 | Hydrazine hydrate | 128 | 145 | 600 | 20–30 / 75–80 | 15 / 4 |
| 3b | 1a | 145 | Menthane diamine | 346 | 145 | 800 | 20–30 / 80–85 | 3 / 8 |
| 4b | 1a | 145 | Ethylene bis oxypropyl amine | 352 | 145 | 800 | 20–30 / 75–80 | 8 / 4 |
| 5b | 1a | 72.3 | Duomeen 12 | 300 | 72 | 600 | 20–30 / 80–85 | 5 / 4 |

TABLE 5—Continued

| Example Number | Polychloromethyl compd. used | Amt., grams | Polyamino compounds used | Amt., grams | KOH used, grams | Methanol used, grams | Temp., °C. | Time, hours |
|---|---|---|---|---|---|---|---|---|
| 6b | 1a | 72.3 | 1-triethylene triamino 2-oleyl imidazoline | 434 | 72 | 800 | 20-30 / 80-85 | 15 / 2 |
| 7b | 2a | 153 | Aminoethyl oleamide | 323 | 72 | 800 | 20-30 / 80-85 | 15 / 2 |
| 8b | 2a | 153 | Hydroxyethyl hydrazine | 76 | 72 | 500 | 20-30 / 75-80 | 4 / 4 |
| 9b | 2a | 153 | Piperazine | 86 | 72 | 500 | 20-35 / 75-80 | 5 / 4 |
| 10b | 2a | 153 | Hydroxyethyl Duomeen 12 | 345 | 72 | 800 | 20-30 / 80-85 | 5 / 5 |
| 11b | 2a | 153 | Diamide of 1M azelaic acid+2 moles ethylene diamine. | 308 | 72 | 800 | 20-30 / 80-85 | 15 / 3 |
| 2b | 2a | 77 | Dodecyl diethylene triamine oleyl amide | 268 | 36 | 1500 | 20-30 / 80-85 | 15 / 3 |
| 13b | 2a | 153 | Dibutyl amino n-dodecane amidine | 325 | 72 | 800 | 20-30 / 80-85 | 15 / 2 |
| 14b | Polyepichloro hydrin, M. Wt.=900. | 186 | 2-aminoethyl amino ethylimidazoline | 310 | 145 | 800 | 20-30 / 80-85 | 15 / 2 |
| 15b | ----do---- | 93 | Duomeen S | 400 | 72 | 600 | 20-30 / 80-85 | 3 / 5 |
| 16b | ----do---- | 47 | Diimidazoline from 1M tetraethylene pentamine and 2M lauric acid. | 272 | 36 | 500 | 20-30 / 80-85 | 15 / 2 |
| 17b | ----do---- | 186 | Triethylene tetramine | 292 | 145 | 700 | 20-30 / 80-85 | 8 / 3.5 |
| 18b | Polyepichlorohydrin, M. Wt.=450. | 186 | ----do---- | 292 | 145 | 700 | 20-30 / 80-85 | 4 / 3.5 |
| 19b | Polyepichlorohydrin, M. Wt.=1150. | 186 | ----do---- | 292 | 145 | 700 | 20-30 / 80-85 | 15 / 3 |
| 20b | ----do---- | 47 | Reaction prod.[1] 1M butyl epoxy stearate+ 1M diethylene triamine. | 243 | 36 | 500 | 20-30 / 80-85 | 3 / 5 |
| 21b | ----do---- | 93 | 1,1 bis (2-amino isobutoxy) butane | 231 | 72 | 500 | 20-30 / 75-80 | 3 / 8 |
| 22b | ----do---- | 93 | Amino propyl rosin Amine D | 372 | 72 | 600 | 20-30 / 75-80 | 3 / 4 |
| 23b | ----do---- | 186 | N-aminoethyl piperazine | 258 | 145 | 800 | 20-30 / 75-80 | 5 / 2 |
| 24b | ----do---- | 186 | Dipropylene triamine | 262 | 145 | 800 | 20-30 / 80-85 | 12 / 3 |

[1] See S.N. 532,121, filed September 1, 1955.

The products formed by the reaction of the halopolymer and the polyamine will vary widely depending on the reactants, on the amount of conversion of reactants to products, the labile hydrogen on the polyamine, etc. In general, the products may be represented as those having plural

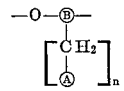

units, wherein Ⓑ is alkylene and $n$ is an integer, for example, plural

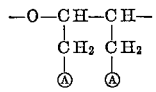

or

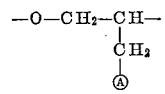

units, wherein Ⓐ represent the radical derived from a polyamine containing a labile hydrogen which has reacted with the labile halogen of the polymer. For example, in the case of an imidazoline, the product would be

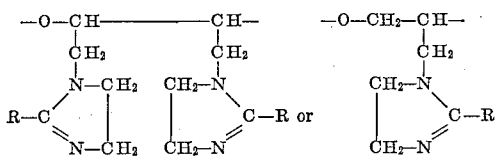

These formulae are presented as idealized representations of the products formed. In practice, particularly in the preparation of commercial products, mixtures of these compositions with other products may be produced, for example, mixtures of the imidazoline with amido polyamine polymers.

Similar products would be formed with other cyclic amidines, for example the tetrahydropyrimidines. Where the polyamine reactant has more than one labile hydrogen, the point of jointure of the polymer with the polyamine will depend on the particular polyamine reacted.

The halopolymer-polyamine reaction products of this invention can be used as such or can be (1) oxyalkylated (2) acylated (3) oxyalkylated, then acylated (4) acylated, then oxyalkylated (5) acylated, then oxyalkylated and then acylated, etc. As employed in the claims, the terms "acylation" and "oxyalkylation" include these permutations in various order of reaction.

Oxyalkylation and acylation are carried out in the conventional manner.

OXYALKYLATED HALOPOLYMER-AMINE REACTION PRODUCTS

The above described products can be oxyalkylated by any of the methods known to the art. They can be oxyalkylated, for example, with ethylene oxide, propylene oxide, butylene oxide, octylene oxide, and other members of the homologous series, epichlorohydrin, methyl glycide, glycide, etc. Substituted alkylene oxides can also be employed, for example, styrene oxide, and the like. They can be oxyalkylated with mixed alkylene oxides to form random polyalkylene oxide moieties,

AABABBAAAB or they can be oxyalkylated to form block polyalkylene oxide moieties, BBBAAABBBAAABBB, wherein A is the unit derived from one alkylene oxide, for example, ethylene oxide, and B is the unit of a second alkylene oxide, for example, propylene oxide. These also include ter-polyalkylene oxide or higher moieties, where 3 or more alkylene oxides are reacted in a random or blockwise pattern.

In view of the fact that oxyalkylation procedures are so well known, for the sake of brevity, particular attention is directed to the various U.S. patents which describe typical oxyalkylation procedure, for example, U.S. Patent 2,652,394, 2,792,371, 2,499,368 and the technical bulletin entitled, "Ethylene Oxide," which has been distributed by the Jefferson Chemical Company of Houston, Texas. Note also the extensive bibliography in this bulletin and the large number of patents which deal with oxyalkylation procedure.

Depending on the particular application desired, one may combine a larger proportion or a smaller proportion of alkylene oxide to polymer-amine product. Thus, the molar ratios of alkylene oxide to polymer-amine can range, for example, from 1:1 weight ratios to ratios of from 1:200 more, but preferably 1:80. By proper control the hydrophilic or hydrophobe properties can be imparted to the polymer-amine. As is well known, oxyalkylations are conducted under a wide variety of conditions, both at low and high pressure, at low and high temperature, in both the presence or absence of catalysts, solvents, etc. For instance, oxyalkylations can be carried out at temperatures of 70–200° C. and pressures of from 10–200 p.s.i. and times of from 15 minutes to several days. Preferably, oxyalkylations are carried out at 80–150° C. at 10–50 p.s.i.

Because of the polyfunctionalability of the oxyalkylation susceptible polymer-amine, cogeneric mixtures are formed rather than single chemical compounds.

*Example 1c*

This example illustrates the oxyalkylation of the reaction product of polydichloromethylbutane and a polyamine.

Reacting similarly as in Example 2a, 132 grams of ethylene oxide, 1740 grams of propylene oxide and then 264 grams of ethylene oxide in that order were added to 200 grams of the product obtained from Example 1b. 200 grams of xylene was used as the solvent and 50 grams of NaOCH$_3$ was used as catalyst. The reaction temperature was maintained at 120–130° C. The total time of reaction was six hours. The product obtained was a light yellow oil-like liquid, soluble in xylene, isopropanol and emulsifiable in water. It was very surface active.

The following examples illustrate the oxyalkylation of the amine-polyepihalohydrin reaction products carried out in the manner of Example 1c.

duced by the oxidation of petroleum. As will be subsequently indicated, there are other acids which have somewhat similar characteristics and are derived from somewhat different sources and are different in structure, but can be included in the broad generic term previously indicated.

Suitable acids include straight chain and branched chain, unsaturated and saturated, aliphatic, alicyclic, fatty aromatic, hydroaromatic, and aralkyl acids, etc.

Examples of saturated aliphatic monocarboxylic acids are acetic, propionic, butyric, valeric, caproic, heptanoic, caprylic, nonanoic, capric, undecanoic, lauric, tridecanoic, myriatic, pentadecanoic, palmitic, heptadecanoic, stearic, nonadecanoic, eicosanoic, heneicosanoic, docosanoic, tricosanoic, tetracosanoic, pentacosanoic, cerotic, heptacosanoic, montanic, nonacosanoic, melissic and the like.

Examples of ethylenic unsaturated aliphatic acids are acrylic, methacrylic, crotonic, anglic, teglic, the pentenoic acids, the nexenoic acids, for example, hydrosorbic acid, the heptenoic acids, the octenoic acids, the nonenoic acids, the decenoic acids, for example, obtusilic acid, the undecenoic acids, the dodencenoic acids, for example, lauroleic, linderic, etc., the tridecenoic acids, the tetradecenoic acids, for example, myristoleic acid, the pentadecenoic acids, the hexadecenoic acids, for example, palmitoleic acid, the heptadecenoic acids, the octodecenoic acids, for example, petrosilenic acid, oleic acid, elardic acid, the nonadecenoic acids, for example, the eicosenoic acids, the docosenoic acids, for example, erucic acid, brassidic acid, cetoleic acid, the tetradosenic acids, and the like.

Examples of dienoic acids are the pentadienoic acids, the hexadienoic acids, for example, sorbic acid, the octadienoic acids, for example linoleic, and the like.

Examples of the trienoic acids are the octadecatrienoic acids, for example, linolenic acid, eleostearic acid, pseudoeleostearic acid, and the like.

Carboxylic acids containing functional groups such as hydroxy groups can be employed. Hydroxy acids, particularly the alpha hydroxy acids include glycolic acid, lactic acid, the hydroxyvaleric acids, the hydroxy caproic acids, the hydroxyheptanoic acids, the hydroxy caprylic acids, the hydroxynonanoic acids, the hydroxycapric acids, the hydroxydecanoic acids, the hydroxy lauric acids, the hydroxy tridecanoic acids, the hydroxymyristic acids,

TABLE 6

| Example No. | Starting material | Alkylene oxide added in order given | Wt. ratio | Catalyst | Temp., ° C. | Time, hrs. |
|---|---|---|---|---|---|---|
| 1c | 1b | Ethylene oxide:Propylene oxide:Ethylene oxide | 1:0.66:8.7:1.32 | NaOCH$_3$ | 120–130 | 6 |
| 2c | 4b | Butylene oxide:Ethylene oxide | 1:6.25:0.42 | NaOCH$_3$ | 120–140 | 7 |
| 3c | 9b | Ethylene oxide | 1:0.2 | NaOCH$_3$ | 120–130 | 1.5 |
| 4c | 15b | Propylene oxide | 1:0.36 | NaOCH$_3$ | 120–130 | 1.5 |
| 5c | 18b | Ethylene oxide:Dodecene oxide:Ethylene oxide | 1:0.87:3.5:1.75 | NaOCH$_3$ | 130–140 | 14 |
| 6c | 23b | C$_{16}$–C$_{18}$ oxide:Ethylene oxide | 1:1.25:2.3 | NaOCH$_3$ | 130–140 | 13 |
| 7c | 4d | Equal molal mixture of ethylene oxide and propylene oxide. | 1:4 | NaOCH$_3$ | 70–80 | 48 |

ACYLATED HALOPOLYMER-AMINE REACTION PRODUCTS

Acylation is carried out under dehydration conditions, i.e., water is removed. A wide variety of acylating agents can be employed. Any of the well-known methods of acylation can be employed. For example, heat alone, heat and reduced pressure, heat in combination with an azeotroping agent, etc., are all satisfactory.

Although a wide variety of carboxylic acids produce excellent products, in our experience monocarboxy acids having more than 6 carbon atoms and less than 40 carbon atoms give most advantageous products. The most common examples include the detergent forming acids, i.e., those acids which combine with alkalies to produce soap or soap-like bodies. The detergent-forming acids, in turn, include naturally-occurring fatty acids, resin acids, such as abietic acid, naturally-occurring petroleum acids, such as naphthenic acids, and carboxy acids, prothe hydroxypentadecanoic acids, the hydroxypalmitic acids, the hydroxyhexadecanoic acids, the hydroxyheptadecanoic acids, the hydroxy stearic acids, the hydroxyoctadecenoic acids, for example, ricinoleic acid, ricinelardic acid, hydroxyoctadecynoic acids, for example, ricinstearolic acid, the hydroxyelcosanoic acids, for example, hydroxyarachidic acid, the hydroxydocosanoic acids, for example, hydroxybehenic acid, and the like.

Examples of acetylated hydroxyacids are ricinoleyl lactic acid, acetyl ricinoleic acid, chloroacetyl ricinoleic acid, and the like.

Examples of the cyclic aliphatic carboxylic acids are those found in petroleum called naphthenic acids, hydnocarbic and chaumoogric acids, cyclopentane carboxylic acids, cyclohexanecarboxylic acid, campholic acid, fencholic acids, and the like.

Examples of aromatic monocarboxylic acids are benzoic acid, substituted benzoic acids, for example, the toluic acids, the xyleneic acids, alkoxy benzoic acid, phenyl benzoic acid, naphthalene carboxylic acid, and the like.

Mixed higher fatty acids derived from animal or vegetable sources, for example, lard, cocoanut oil, rapeseed oil, sesame oil, palm kernel oil, palmoil, olive oil, corn oil, cottonseed oil, sardine oil, tallow, soybean oil, peanut oil, castor oil, seal oils, whale oil, shark oil, and other fish oils, teaseed oil, partially or completely hydrogenated animal and vegetable oils are advantageously employed. Fatty and similar acids include those derived from various waxes, such as beeswax, spermaceti, montan wax, Japan wax, coccerin and carnauba wax. Such acids include carnaubic acid, cerotic acid, lacceric acid, montanic acid, psyllastearic aid, etc. One may also employ higher molecular weight carboxylic acids derived by oxidation and other methods, such as from paraffin wax, petroleum and similar hydrocarbons; resinic and hydroaromatic acids, such as hexahydrobenzoic acid, hydrogenated naphthoic, hydrogenated carboxy diphenyl, naphthenic, and abietic acid; Twitchell fatty acids, carboxydiphenyl pyridine carboxylic acid, blown oils, blown oil fatty acids and the like.

Other suitable acids include phenylstearic acid, benzoylnonylic acid, cetyloxybutyric acid, cetyloxyacetic acid, chlorstearic acid, etc.

Examples of the polycarboxylic acids are those of the aliphatic series, for example, oxalic, malonic, succinic, glutaric, adipic, pimelic, suberic, azelaic, sebacic, nonanedicarboxylic acid, decanedicarboxylic acids, undecanedicarboxylic acids, and the like.

Examples of unsaturated aliphatic polycarboxylic acids are fumaric, maleic, mesocenic, citraconic, glutonic, itaconic, muconic, aconitic acids, and the like.

Examples of aromatic polycarboxylic acids are phthalic, isophthalic acids, terephthalic acids, substituted derivatives thereof (e.g., alkyl, chloro, alkoxy, etc. derivatives), biphenyldicarboxylic acid, diphenylether dicarboxylic acids, diphenylsulfone dicarboxylic acids and the like.

Higher aromatic polycarboxylic acids containing more than two carboxylic groups are himimellitic, trimellitic, trimesic, mellophanic, prehnitic, pyromellitic acids, mellitic acid, and the like.

Other polycarboxylic acids are the dimeric, trimeric and polymeric acids, for example, dilinoleic, trilinoleic, and other polyacids sold by Emery Industries, and the like. Other polycarboxylic acids include those containing ether groups, for example, diglycolic acid. Mixtures of the above acids can be advantageously employed.

In addition, acid precursors such as esters, glycerides, etc. can be employed in place of the free acid.

The moles of acylating agent reacted with the polymeramino compound will depend on the number of acetylation reactive positions contained therein as well as the number of moles one wishes to incorporate into the molecule. We have advantageously reacted 1 to 20 moles of acylating agent per mole of amino polymer, but preferably 3 to 10 moles.

The product formed on acylation will vary with the particular polymer-polyamine employed and acylation conditions. For example, if the polyamine which has combined with the halopolymer forms a composition which is capable of foming a cyclic amidine upon acylation and the reaction is carried out so that two moles of water are recovered for each mole of carboxylic acid employed, then a cyclic amidine product would be formed. On the other hand, if the polymer-amine product is a non-cyclic amidine forming and/or if the reaction is not carried out so that only one mole rather than two moles of water are removed for each carboxylic acid, then an amide would be formed. For example, if a polymer-amine reaction product having plural

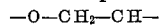

units is acylated so that only one mole of water is removed then the product would be an amido polyamine polymer

However, if the reaction is continued so that a second mole of water is removed, then the product would be

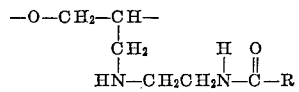

In addition, esters can also be formed on acylation where hydroxy groups are present. For example, the polymer backbone at the terminal position, prior oxyalkylated materials, hydroxylated polyamines, etc. may contain reactive hydroxy groups that form esters on acylation.

Moreover, where other reactive groups are present, the reaction products will not be as clearly defined for example, if a triamine or higher amine product is employed, since more reactive positions are present. Therefore, "acylation," as employed in the claims, refers to the formation of products of carboxylic acids and functional groups present in the polymer-amine. Thus, it includes esterification, amidification, formation of cyclic amidines, etc.

Moreover, it should be understood that in many instances the products formed will be cogeneric mixtures, for example of cyclic amidines, amides, amido cyclic amidines, amino cyclic amidines, etc.

The following examples illustrate the preparation of amides, and other acylated products.

*Example 1d*

In a flask equipped with a stirrer, a thermometer, a Dean and Stark distillation receiver and a nitrogen inlet, 280 grams of oleic acid was added to 68 grams of the product obtained from Example 2b. After thoroughly mixed for 20 minutes, a slow stream of nitrogen was introduced and the mixture was slowly heated to 160–170° C. within an hour. As soon as the temperature reached 160° C., water began to collect in the Dean and Stark receiver. The heating was continued at 160–170° C. for two more hours. The total amount of aqueous condensate accumulated was 18.4 ml.

The product was a dark yellow viscous liquid, soluble in xylene, isopropanol and dilute acid, insoluble in water.

TABLE 7

| Example Number | Compound used | Amt., grams | Acylation reagent | Amt., grams | Temperature, °C. | Time, hours | Water Removed (ml.) |
|---|---|---|---|---|---|---|---|
| 1d | 2b | 68 | Oleic acid | 280 | 160–170 | 2 | 18.4 |
| 2d | 8b | 193 | Ricinoleic acid | 299 | 160–170 | 2 | 17.8 |
| 3d | 15b | 456 | Diglycolic acid | 152 | 160–170 | 2 | 18.9 |
| 4d | 18b | 202 | Lauric acid | 200 | 160–170 | 2 | 18.2 |
| 5d | 23b | 185 | Naphthenic acid | 320 | 160–170 | 3.5 | 17.3 |
| 6d | 2c | 162 | Maleic anhydride | 30 | 170–190 | 3 | None |
| 7d | 3c | 264 | Dilinoleic acid (Emery Ind.) | 560 | 170–180 | 3.5 | 18.5 |
| 8d | 4c | 659 | Adipic acid | 438 | 170–190 | 3 | 55.3 |
| 9d | 7c | 192 | Phthalic anhydride | 40 | 160–170 | 4 | None |

The following examples illustrate the preparation of cyclic amidines containing polymers:

*Example 1e*

In a similar equipment setup like that used in Example 1d, 284 grams of oleic acid and 202 grams of the product obtained from Example 17b was mixed and reacted. The temperature was slowly brought up to 160–170° C. within an hour. Then it was maintained at 160–170° C. for approximately 2 hours while 18.1 mls. of aqueous distillate was collected in the Dean and Stark distillation receiver. A sample of 25 grams was taken at this stage. The product obtained was the polyamino amide.

Without discontinuing heating, the temperature of the mixture was raised to 260–280° C. and maintained at this temperature for three hours. The aqueous distillate collected amounted 17 mls.

The product obtained was a viscous paste, dark brown in color, soluble in xylene, isopropanol dilute acid and emulsifiable in water.

general formula $N^+X^-$, wherein N comprises the part of the compounds containing the nitrogen group which has been rendered positively charged by the H or R of the alkylating compound and X represents the anion derived from the alkylating compound.

Thus, it is possible to add a high molal acid or low molal acid so as to form a salt with the residual basicity. In a number of instances salt formation changes or alters the solubility of the free base in either oil or water and for a number of purposes makes the salt form more attractive. Where the base has a plurality of basic nitrogen atoms one can neutralize one or more as desired. Thus, the basic products of reaction can be reacted with low molal acids such as acetic acid, lactic acid, glycolic acid, propionic acid, diglycolic acid and the like. On the other hand one can use naphthenic acid, higher fatty acids, tall oil sulfonic acids, and particularly oil soluble petroleum sulfonic acids such as mahogany acids to form salts.

The following examples illustrate the preparation of salts of the polymer-amine reaction product. The amount

TABLE 8

| Example Number | Compound used | Amt., grams | Organic acid or equivalent | Amt., grams | Temp. | Time | Water obtained, ml. |
|---|---|---|---|---|---|---|---|
| 1e | 17b | 202 | Oleic acid | 280 | 160–170 | 2 | 18.1 |
|    |     |     |            |     | 260–280 | 3 | 17.1 |
| 2e | 17b | 810 | do | 280 | 160–170 | 2 | 18.2 |
|    |     |     |    |     | 250–260 | 3 | 17.6 |
| 3e | 18b | 202 | Soybean oil | 295 | 170–180 | 3 | None |
|    |     |     |             |     | 270–280 | 3 | 18.3 |
| 4e | 18b | 202 | Lauric acid | 200 | 160–170 | 2 | 18.2 |
|    |     |     |             |     | 250–260 | 3 | 17.1 |
| 5e | 18b | 202 | Methyl oleate | 300 | 160–200 | 3 | [1] 34 |
|    |     |     |               |     | 260–280 |   | 18.1 |
| 6e | 19b | 202 | Naphthenic acid | 320 | 160–180 | 3 | 17.8 |
|    |     |     |                 |     | 270–290 | 5 | 17.5 |
| 7e | 19b | 202 | Ricinoleic acid | 300 | 160–180 | 2 | 18.2 |
|    |     |     |                 |     | 250–260 | 3 | 18.3 |
| 8e | 24b | 202 | Stearic acid | 282 | 160–180 | 2 | 17.9 |
|    |     |     |              |     | 250–260 | 3 | 17.7 |
| 9e | 24b | 202 | Caprylic acid | 144 | 160–180 | 2 | 18.1 |
|    |     |     |               |     | 250–260 | 3 | 18.4 |

[1] Methanol.

Many of these acylated polymers have also been oxy-alkylated to yield useful products.

SALTS OF COMPOSITIONS IN THIS INVENTION

Other very useful derivatives of the composition of this invention comprise acid salts and quaternary salts, derived therefrom. Since the compositions of this invention contain basic nitrogen groups, they are capable of reacting with inorganic acids, for example hydrohalogens (HCl, HBr, HI), sulfuric acid, phosphoric acid, etc., aliphatic acids (acetic, propionic, glycolic, diglycolic, etc.), aromatic acids (benzoic, salicylic, phthalic, etc.), and organic compounds capable of forming salts, for example, those having the general formula RX wherein R is an organic group, such as an alkyl group (e.g., methyl, ethyl, propyl, butyl, octyl, nonyl, decyl, undecyl, dodecyl, undecyl, tridecyl, pentadecyl, oleyl, octadecyl, etc.), cycloalkyl (e.g., cyclopentyl, cyclohexyl, etc.), aralkyl (e.g., benzyl, etc.), aralkyl (e.g., benzyl, etc.), and the like, and X is a radical capable of forming a salt such as those derived from acids (e.g., halide, sulfate, phosphate, sulfonate, etc., radicals). The preparation of these salts and quaternary compounds is well known to the chemical art. For example, they may be prepared by adding suitable acids (for example, any of those mentioned herein as acylating agents) to solutions of the basic composition or by heating such compounds as alkyl halides with these compositions. Diacid and quaternary salts can also be formed by reacting alkylene dihalides, polyacids, etc. The number of moles of acid and quaternary compounds that may react with the composition of this invention will, of course, depend on the number of basic nitrogen groups in the molecule. These salts may be represented by the of acid shown in the table was gradually added to the grams of amino polymer shown.

TABLE 9

| Example Number | Amino polymer | Amt., grams | Acid used | Amt., grams |
|---|---|---|---|---|
| 1 | 1b | 100 | Acetic acid | 29 |
| 2 | 4b | 100 | Glycolic acid (67.5%) | 49 |
| 3 | 8b | 100 | Lauric acid | 109 |
| 4 | 12b | 100 | Oleic acid | 43 |
| 5 | 15b | 100 | Dodecyl benzene sulfonic acid | 66 |
| 6 | 19b | 100 | Sulfamic acid | 88 |
| 7 | 22b | 100 | Diisopropyl naphthalene sulfonic acid (84%) | 76 |

USES

This invention also relates to methods of using these products, which have an unexpectedly broad spectrum of uses, for example, as demulsifiers for water-in-oil emulsions; as demulsifiers for oil-in-water emulsions; as corrosion inhibitors; as fuel oil additives for gasoline, diesel fuel, jet fuel, and the like; as lubricating oil additives; as scale preventatives; as chelating agents or to form chelates which are themselves useful, for example, as anti-oxidants, fungicides, etc.; as flotation agents, for example, as flotation collection agents; as asphalt additives or anti-stripping agents for asphalt-mineral aggregate compositions; as additives for compositions useful in acidizing calcereous stratas of oil wells; as additives for treating water used in the secondary recovery of oil and in disposal wells; as additives used in treating oil-well strata in primary oil recovery to enhance the flow of oil; as emulsifiers for both oil-in-water and water-in-oil emulsions; as additives for slushing oils;

as additives for cutting oils; as additives for oil to prevent emulsification during transport; as additives for drilling muds; as agents useful in removing mud sheaths from newly drilled wells; as dehazing or "fog-inhibiting" agents for fuels; as additives for preparing sand or mineral slurries useful in treating oil wells to enhance the recovery of oil; as agents for producing polymeric emulsions useful in preparing water-vapor impermeable paper board; as agents in paraffin solvents; as agents in preparing thickened silica aerogel lubricants; as gasoline anti-oxidant additives; as deicing agents for fuels; as antiseptic, preservative, bactericidal, bacteriostatic, germicidal, fungicidal agents; as agents for the textile industry, for example, as mercerizing assistants, as wetting agents, as rewetting agents, as dispersing agents, as detergents, as penetrating agents, as softening agents, as dyeing assistants, as anti-static agents, and the like; as additives for rubber lattices; as entraining agents for concrete and cements; as anti-static agents for rugs, floors, upholstery, plastic and wax polishes, textiles, etc.; as detergents useful in metal cleaners, in floor oils, in dry cleaning, in general cleaning, and the like; as agents useful in leather processes such as in flat liquoring, pickling, acid degreasing, dye fixing, and the like; as agents in metal pickling; as additives in paints for improved adhesion of primers, in preventing water-spotting in lacquer; as anti-skinners for pigment flushing, grinding and dispersing, as antifeathering agents in ink; as agents in the preparation of wood pulp and pulp slurries, as emulsifiers for insecticidal compositions and agricultural sprays such as DDT, 24–D (Toxaphene), chlordane, nicotine sulfate, hexachloracyclohexane, and the like; as agents useful in building materials, for example, in the water repellent treatment of plaster, concrete, cement, roofing materials, floor sealers; as additives in bonding agents for various insulating building materials; and the like.

Having thus described our invention, what we claim as new and desire to obtain by Letters Patent is:

1. A solvent-soluble reaction product of
   (I) a member selected from the group consisting of
       (1) polymerized epichlorohydrin and
       (2) a copolymer of an alkylene oxide and epichlorohydrin with
   (II) a polyamine containing an active nitrogen-bonded hydrogen, said polyamine being a polyamine selected from the group consisting of diethylene triamine and triethylene tetramine,
said reaction product being formed by reacting (II) with (I), the number of moles of (II) being at least equal to the number of chemically equivalent chloro groups in (I), in an inert solvent, (I) and (II) being employed in a concentration of not greater than about 50%, said concentration being based on the weight of (I) and (II), at a temperature not greater than about 150° C.

2. A solvent-soluble reaction product of
   (I) a member selected from the group consisting of
       (1) polymerized epichlorohydrin and
       (2) a copolymer of an alkylene oxide and epichlorohydrin with
   (II) a polyamine containing an active nitrogen-bonded hydrogen, said polyamine being a polyamine selected from the group consisting of diethylene triamine and triethylene tetramine,
said reaction product being formed by reacting (II) with (I), the number of moles of (I) being at least equal to the number of equivalent reactive hydrogens on the amino group of (II), in an inert solvent, (I) and (II) being employed in a concentration of not greater than about 50%, said concentration being based on the weight of (I) and (II), at a temperature not greater than about 150° C.

3. A solvent-soluble reaction product of
   (I) a member selected from the group consisting of
       (1) polymerized 1,4-dichloroepoxybutane and
       (2) a copolymer of an alkylene oxide and 1,4-dichloroepoxybutane.

with
   (II) a polyamine containing an active nitrogen-bonded hydrogen, said polyamine being a polyamine selected from the group consisting of diethylene triamine and triethylene tetramine,
said reaction product being formed by reacting (II) with (I), the number of moles of (II) being at least equal to the number of chemically equivalent chloro groups in (I), in an inert solvent, (I) and (II) being employed in a concentration of not greater than about 50%, said concentration being based on the weight of (I) and (II), at a temperature not greater than about 150° C.

4. A solvent-soluble reaction product of
   (I) a member selected from the group consisting of
       (1) polymerized 1,4-dichloroepoxybutane and
       (2) a copolymer of an alkylene oxide and 1,4-dichloroepoxybutane
with
   (II) a polyamine containing an active nitrogen-bonded hydrogen, said polyamine being a polyamine selected from the group consisting of diethylene triamine and triethylene tetramine,
said reaction product being formed by reacting (II) with (I), the number of moles of (I) being at least equal to the number of equivalent reactive hydrogens on the amino group of (II), in an inert solvent, (I) and (II) being employed in a concentration of not greater than about 50%, said concentration being based on the weight of (I) and (II), at a temperature not greater than about 150° C.

5. A solvent-soluble reaction product of
   (I) polymerized epichlorohydrin
with
   (II) triethylene tetramine,
said reaction product being formed by reacting (II) with (I), the number of moles of (II) being at least equal to the number of chemically equivalent chloro groups in (I), in an inert solvent, (I) and (II) being employed in a concentration of not greater than about 50%, said concentration being based on the weight of (I) and (II), at a temperature not greater than about 150° C.

6. A solvent-soluble reaction product of
   (I) polymerized epichlorohydrin
with
   (II) triethylene tetramine,
said reaction product being formed by reacting (II) with (I), the number of moles of (I) being at least equal to the number of equivalent reactive hydrogens on the amino group of (II), in an inert solvent, (I) and (II) being employed in a concentration of not greater than about 50%, said concentration being based on the weight of (I) and (II), at a temperature not greater than about 150° C.

7. A compound selected from the group consisting of
   (I) the reaction product of
       (1) the solvent-soluble product of claim 1 and
       (2) a member selected from the group consisting of
           (i) an organic carboxylic acid, under dehydration conditions,
           (ii) an alkylene oxide, and
           (iii) mixtures of (i) and (ii)
and
   (II) salts of said product of claim 1.

8. A compound selected from the group consisting of
   (I) the reaction product of
       (1) the solvent-soluble product of claim 2 and
       (2) a member selected from the group consisting of
           (i) an organic carboxylic acid, under dehydration conditions,
           (ii) an alkylene oxide, and
           (iii) mixtures of (i) and (ii)
and
   (II) salts of said product of claim 2.

9. A compound selected from the group consisting of
(I) the reaction product of
    (1) the solvent-soluble product of claim 3 and
    (2) a member selected from the group consisting of
        (i) an organic carboxylic acid, under dehydration conditions,
        (ii) an alkylene oxide, and
        (iii) mixtures of (i) and (ii)
and
(II) salts of said product of claim 3.

10. A compound selected from the group consisting of
(I) the reaction product of
    (1) the solvent-soluble product of claim 4 and
    (2) a member selected from the group consisting of
        (i)) an organic carboxylic acid, under dehydration conditions,
        (ii) an alkylene oxide, and
        (iii) mixtures of (i) and (ii)
and
(II) salts of said product of claim 4.

11. A compound selected from the group consisting of
(I) the reaction product of
    (1) the solvent-soluble product of claim 5 and
    (2) a member selected from the group consisting of
        (i) an organic carboxylic acid, under dehydration conditions,
        (ii) an alkylene oxide, and
        (iii) mixtures of (i) and (ii)
and
(II) salts of said product of claim 5.

12. A compound selected from the group consisting of
(I) the reaction product of
    (1) the solvent-soluble product of claim 6 and
    (2) a member selected from the group consisting of
        (i) an organic carboxylic acid, under dehydration conditions,
        (ii) an alkylene oxide, and
        (iii) mixtures of (i) and (ii)
and
(II) salts of said product of claim 6.

References Cited by the Examiner

UNITED STATES PATENTS

| | | |
|---|---|---|
| 2,434,179 | 1/1948 | Sharkey. |
| 2,498,195 | 2/1950 | Ballard et al. |
| 2,538,072 | 1/1951 | Zeh. |
| 2,581,384 | 1/1952 | De Groote et al. _____ 260—47 |
| 2,840,533 | 6/1958 | Hwa _____ 260—2.1 |
| 2,862,894 | 12/1958 | Hwa _____ 260—2.1 |
| 2,871,219 | 1/1959 | Baggett et al. _____ 260—2 XR |
| 2,891,073 | 6/1959 | Smith _____ 260—2 XR |
| 3,026,270 | 3/1962 | Robinson _____ 260—2 |
| 3,058,921 | 10/1962 | Pannell _____ 260—42 XR |

WILLIAM H. SHORT, *Primary Examiner.*

MILTON STERMAN, LOUISE P. QUAST, *Examiners.*

T. D. KERWIN, R. A. BURROUGHS,
                          *Assistant Examiners.*